United States Patent
Han et al.

(10) Patent No.: US 11,634,575 B2
(45) Date of Patent: Apr. 25, 2023

(54) THERMOPLASTIC RESIN COMPOSITION, METHOD OF PREPARING THE SAME, AND MOLDED ARTICLE INCLUDING THE SAME

(71) Applicant: LG CHEM, LTD., Seoul (KR)

(72) Inventors: Seunghun Han, Daejeon (KR); Suk Jo Choi, Daejeon (KR); Jinoh Nam, Daejeon (KR); Seong Lyong Kim, Daejeon (KR)

(73) Assignee: LG CHEM, LTD., Seoul (KR)

(*) Notice: Subject to any disclaimer, the term of this patent is extended or adjusted under 35 U.S.C. 154(b) by 349 days.

(21) Appl. No.: 16/976,453

(22) PCT Filed: Nov. 7, 2019

(86) PCT No.: PCT/KR2019/015089
§ 371 (c)(1),
(2) Date: Aug. 27, 2020

(87) PCT Pub. No.: WO2020/149504
PCT Pub. Date: Jul. 23, 2020

(65) Prior Publication Data
US 2021/0047507 A1    Feb. 18, 2021

(30) Foreign Application Priority Data
Jan. 17, 2019    (KR) .................. 10-2019-0006154

(51) Int. Cl.
C08L 55/02    (2006.01)
C08L 25/12    (2006.01)
C08L 79/02    (2006.01)

(52) U.S. Cl.
CPC ............. C08L 55/02 (2013.01); C08L 25/12 (2013.01); C08L 79/02 (2013.01); C08L 2203/30 (2013.01); C08L 2205/03 (2013.01)

(58) Field of Classification Search
CPC .. C08I 55/02; C08I 25/12; C08I 79/02; C08G 73/024
See application file for complete search history.

(56) References Cited

U.S. PATENT DOCUMENTS

2012/0181487 A1* 7/2012 Gibon .................. C08L 77/02
977/734
2016/0326362 A1    11/2016 Oh et al.
2019/0177523 A1*  6/2019 Jung .................... B29C 66/54

FOREIGN PATENT DOCUMENTS

CN    102634221 A    8/2012
CN    103648611 A    3/2014
(Continued)

OTHER PUBLICATIONS

BASF Lupasol(r) PN 80 Technical Data Sheet, p. 1 (Year: 2017).*
Extended European Search Report for PCT/KR2019015089, dated Apr. 20, 2021.

*Primary Examiner* — Irina S Zemel
*Assistant Examiner* — Surbhi M Du

(57) ABSTRACT

The present invention relates to a thermoplastic resin composition, a method of preparing the same, and a molded article including the same. More specifically, the present invention relates to a thermoplastic resin composition including 100 parts by weight of a base resin including a vinyl cyanide compound-conjugated diene compound-aromatic vinyl compound graft copolymer and an α-methyl styrene compound-vinyl cyanide compound copolymer and 0.4 to 3 parts by weight of an alkoxylated polyethyleneimine, a method of preparing the thermoplastic resin composition, and a molded article including the thermoplastic resin composition. The thermoplastic resin composition according to the present invention has improved chemical (Continued)

resistance to solvents such as thinner without degradation in fluidity and mechanical properties, and thus has excellent paintability.

11 Claims, 1 Drawing Sheet

(56) References Cited

FOREIGN PATENT DOCUMENTS

| | | |
|---|---|---|
| CN | 107001746 A | 8/2017 |
| EP | 0056115 A2 * | 7/1982 |
| EP | 0056115 A2 | 7/1982 |
| EP | 3214126 A1 | 9/2017 |
| JP | 1995-047679 | 5/1995 |
| KR | 20040014564 A | 2/2004 |
| KR | 10-2006-0079106 A | 7/2006 |
| KR | 10-2010-0006499 A | 1/2010 |
| KR | 10-2014-0024021 A | 2/2014 |
| KR | 10-2015-0067743 A | 6/2015 |
| KR | 20150067714 A | 6/2015 |
| KR | 20160048891 A | 5/2016 |
| KR | 10-2017-0055436 A | 5/2017 |
| KR | 10-1772268 B1 | 8/2017 |
| KR | 10-2018-0068566 A | 6/2018 |
| WO | WO-2014060456 A2 * | 4/2014 ............ C08F 220/18 |

* cited by examiner

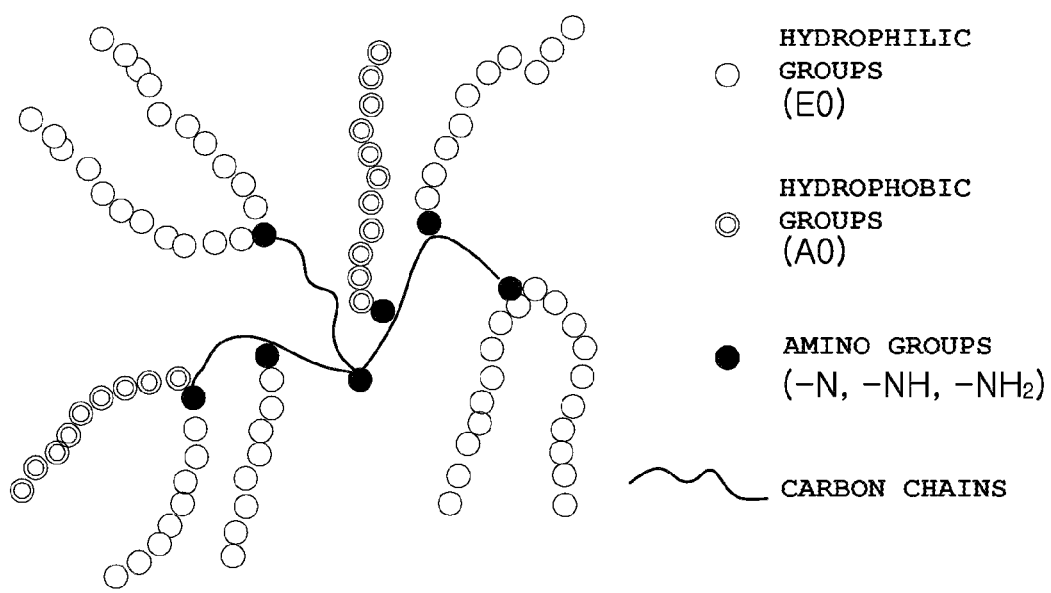

THERMOPLASTIC RESIN COMPOSITION, METHOD OF PREPARING THE SAME, AND MOLDED ARTICLE INCLUDING THE SAME

CROSS-REFERENCE TO RELATED APPLICATION

The present application is a National Phase entry of International Application No. PCT/KR2019/015089, which claims priority to Korean Patent Application No. 10-2019-0006154, filed on Jan. 17, 2019 in the Korean Intellectual Property Office, the disclosures of which are incorporated herein by reference.

TECHNICAL FIELD

The present invention relates to a thermoplastic resin composition, a method of preparing the same, and a molded article including the same. More specifically, the present invention relates to a thermoplastic resin composition having improved chemical resistance to solvents such as thinner and excellent paintability without degradation in fluidity, mechanical properties, and heat deflection temperature, a method of preparing the thermoplastic resin composition, and a molded article including the thermoplastic resin composition.

BACKGROUND ART

Vinyl cyanide compound-conjugated diene compound-aromatic vinyl compound graft copolymers represented by acrylonitrile-butadiene-styrene resins (hereinafter referred to as 'ABS resins') have excellent impact resistance, chemical resistance, and weather resistance while being less harmful to humans, and have excellent moldability such as injection molding and extrusion molding and secondary processability. With these advantages, vinyl cyanide compound-conjugated diene compound-aromatic vinyl compound graft copolymers are widely used in various technical fields.

In general, ABS resins are subjected to post-processing, such as a painting process. In a painting process, a chemical solvent such as thinner is used to properly paint the surface of an ABS resin with a painting material. In this case, components contained in the chemical solvent cause severe distortion of the surface of a rubber component contained in the ABS resin, and after painting, the adhesive surface between paint and the molded resin becomes uneven, generating cracks of various sizes. As a result, generation of pinholes, which is a type of painting defect, is caused.

To solve these problems, a method of diluting components contained in a chemical solvent and a method of using a styrene-acrylonitrile (SAN) resin having a high content of acrylonitrile (AN) to prevent rubber components from being damaged have been proposed. However, there is inconvenience in that a molded resin should be exposed to a diluted solvent for a long time. In addition, when a styrene-acrylonitrile (SAN) resin having a high content of acrylonitrile (AN) is used, there is a problem that chemical resistance and gloss are lowered.

In addition, a method of increasing the content, size, or molecular weight of butadiene rubber, which is a monomer used as a raw material for preparation of an ABS resin, has been studied. In this case, since residual stress in a molded article is increased due to decrease in fluidity, there are limitations in solving a painting defect, i.e., generation of pinholes.

Therefore, an ABS resin composition having improved chemical resistance and paintability and excellent physical properties such as fluidity needs to be developed.

RELATED ART DOCUMENTS

[Patent Documents] Japanese Patent No. hei 7-47679

DISCLOSURE

Technical Problem

Therefore, the present invention has been made in view of the above problems, and it is one object of the present invention to provide a thermoplastic resin composition.

It is another object of the present invention to provide a method of preparing the thermoplastic resin composition.

It is yet another object of the present invention to provide a molded article manufactured using the thermoplastic resin composition.

The above and other objects can be accomplished by the present disclosure described below.

Technical Solution

In accordance with one aspect of the present invention, provided a thermoplastic resin composition including 100 parts by weight of a base resin including 20 to 40% by weight of a vinyl cyanide compound-conjugated diene compound-aromatic vinyl compound graft copolymer and 60 to 80% by weight of an α-methyl styrene compound-vinyl cyanide compound copolymer; and 0.4 to 3 parts by weight of an alkoxylated polyethyleneimine.

In accordance with another aspect of the present invention, provided is a method of preparing a thermoplastic resin composition, the method including melt-kneading and extruding 100 parts by weight of a base resin including 20 to 40% by weight of a vinyl cyanide compound-conjugated diene compound-aromatic vinyl compound graft copolymer and 60 to 80% by weight of an α-methyl styrene compound-vinyl cyanide compound copolymer and 0.4 to 3 parts by weight of an alkoxylated polyethyleneimine at 230 to 270° C. and 200 to 400 rpm.

In accordance with yet another aspect of the present invention, provided is a molded article manufactured using the thermoplastic resin composition.

Advantageous Effects

According to the present invention, when alkoxylated polyethyleneimine is included in a thermoplastic resin, a thermoplastic resin composition having improved chemical resistance and excellent paintability without degradation in fluidity, heat resistance, and mechanical strength can be provided. In addition, the present invention provides a method of preparing the thermoplastic resin composition and a molded article including the thermoplastic resin composition.

DESCRIPTION OF DRAWINGS

FIG. 1 schematically illustrates alkoxylated polyethyleneimine.

BEST MODE

Hereinafter, a thermoplastic resin composition of the present invention will be described in detail.

The present inventors confirmed that, when an alkoxylated polyethyleneimine was included in a thermoplastic resin including an ABS resin, chemical resistance and paintability were greatly improved without degradation in fluidity, heat resistance, and mechanical strength. Based on these results, the present inventors conducted additional studies to complete the present invention.

Detailed description of the thermoplastic resin composition of the present invention is as follows.

The thermoplastic resin composition of the present invention includes 100 parts by weight of a base resin including 20 to 40% by weight of a vinyl cyanide compound-conjugated diene compound-aromatic vinyl compound graft copolymer and 60 to 80% by weight of an α-methyl styrene compound-vinyl cyanide compound copolymer; and 0.4 to 3 parts by weight of an alkoxylated polyethyleneimine. In this case, chemical resistance and paintability may be excellent without degradation in fluidity, heat resistance, and mechanical strength.

Detailed description of each of the components constituting the thermoplastic resin composition of the present invention is as follows.

(a) Vinyl Cyanide Compound-Conjugated Diene Compound-Aromatic Vinyl Compound Graft Copolymer For example, the vinyl cyanide compound-conjugated diene compound-aromatic vinyl compound graft copolymer (a) may be included in an amount of 20 to 40% by weight or 20 to 35% by weight, preferably 25 to 32% by weight, more preferably 27 to 30% by weight in a base resin. Within this range, mechanical strength, fluidity, and physical property balance may be excellent.

For example, the vinyl cyanide compound-conjugated diene compound-aromatic vinyl compound graft copolymer (a) may be a graft copolymer prepared by graft-polymerizing 40 to 80% by weight of conjugated diene rubber, 10 to 40% by weight of an aromatic vinyl compound, and 1 to 20% by weight of a vinyl cyanide compound. In this case, impact resistance may be excellent.

Preferably, the vinyl cyanide compound-conjugated diene compound-aromatic vinyl compound graft copolymer (a) is a graft copolymer prepared by graft-polymerizing 45 to 70% by weight of conjugated diene rubber, 20 to 40% by weight of an aromatic vinyl compound, and 5 to 20% by weight of a vinyl cyanide compound. In this case, impact resistance may be excellent.

More preferably, the vinyl cyanide compound-conjugated diene compound-aromatic vinyl compound graft copolymer (a) is a graft copolymer prepared by graft-polymerizing 50 to 65% by weight of conjugated diene rubber, 20 to 35% by weight of an aromatic vinyl compound, and 5 to 15% by weight of a vinyl cyanide compound. In this case, impact resistance may be excellent.

For example, the vinyl cyanide compound-conjugated diene compound-aromatic vinyl compound graft copolymer (a) may include 10 to 40% by weight or 20 to 30% by weight of a vinyl cyanide compound-conjugated diene compound-aromatic vinyl compound graft copolymer containing conjugated diene rubber having an average particle diameter of 0.05 to 0.2 μm; and 60 to 90% by weight or 70 to 80% by weight of a vinyl cyanide compound-conjugated diene compound-aromatic vinyl compound graft copolymer containing conjugated diene rubber having an average particle diameter of more than 0.2 μm and less than or equal to 0.5 μm. In this case, heat resistance may be excellent.

Preferably, the vinyl cyanide compound-conjugated diene compound-aromatic vinyl compound graft copolymer (a) includes 10 to 40% by weight or 20 to 30% by weight of a vinyl cyanide compound-conjugated diene compound-aromatic vinyl compound graft copolymer containing conjugated diene rubber having an average particle diameter of 0.1 to 0.15 μm; and 60 to 90% by weight or 70 to 80% by weight of a vinyl cyanide compound-conjugated diene compound-aromatic vinyl compound graft copolymer containing conjugated diene rubber having an average particle diameter of 0.3 to 0.4 μm. In this case, heat resistance may be excellent.

In the present invention, the average particle diameter of conjugated diene rubber may be calculated using an intensity value measured in a Gaussian mode using a Nicomp 370HPL (Nicomp Co., USA) according to a dynamic laser light scattering method.

For example, the conjugated diene compound may include one or more selected from the group consisting of 1,3-butadiene, 2,3-dimethyl-1,3-butadiene, 2-ethyl-1,3-butadiene, 1,3-pentadiene, isoprene, chloroprene, and piperylene.

For example, the aromatic vinyl compound may include one or more selected from the group consisting of styrene, α-methylstyrene, p-methylstyrene, o-ethylstyrene, p-ethylstyrene, and vinyltoluene.

For example, the vinyl cyanide compound may be acrylonitrile, methacrylonitrile, or a mixture thereof.

For example, the vinyl cyanide compound-conjugated diene compound-aromatic vinyl compound graft copolymer (a) may be prepared using a known polymerization method such as emulsion polymerization, suspension polymerization, or bulk polymerization, without particular limitation.

For example, when the vinyl cyanide compound-conjugated diene compound-aromatic vinyl compound graft copolymer (a) is prepared using emulsion graft polymerization, based on 100 parts by weight in total of conjugated diene rubber, an aromatic vinyl compound, and a vinyl cyanide compound included in the graft copolymer, a monomer mixture including 1 to 20% by weight of the vinyl cyanide compound and 10 to 40% by weight of the aromatic vinyl compound may be added to a mixed solution containing 40 to 80% by weight of conjugated diene rubber, 0.1 to 5 parts by weight of an emulsifier, 0.1 to 3 parts by weight of a molecular weight modifier, and 0.05 to 1 part by weight of a polymerization initiator continuously or batchwise.

For example, the emulsifier may include one or more selected from the group consisting of allyl aryl sulfonates, alkali methyl alkyl sulfonates, sulfonated alkyl esters, fatty acid soap, and rosin acid alkali salts. In this case, polymerization stability may be improved.

For example, the molecular weight modifier may include one or more selected from the group consisting of t-dodecyl mercaptan, n-dodecyl mercaptan, n-octyl mercaptan, and carbon tetrachloride. Preferably, the molecular weight modifier is t-dodecyl mercaptan.

For example, the polymerization initiator may include one or more selected from the group consisting of potassium persulfate, sodium persulfate, and ammonium persulfate. In this case, emulsion polymerization may be efficiently performed.

For example, latex prepared by graft emulsion polymerization may be coagulated using a coagulant such as sulfuric acid, $MgSO_4$, $CaCl_2$, or $Al_2(SO_4)_3$, and then the coagulated latex may be aged, dehydrated, and dried to obtain powdered latex.

α-Methyl Styrene Compound-Vinyl Cyanide Compound Copolymer

For example, the α-methyl styrene compound-vinyl cyanide compound copolymer may be included in an amount of 60 to 80% by weight or 65 to 80% by weight, preferably 68 to 75% by weight, more preferably 70 to 73% by weight in a base resin. In this case, heat resistance and physical property balance may be excellent.

For example, the α-methyl styrene compound-vinyl cyanide compound copolymer may have a weight average molecular weight of 70,000 to 150,000 g/mol, preferably 80,000 to 140,000 g/mol, more preferably 90,000 to 130,000 g/mol. Within this range, heat resistance and physical property balance may be excellent.

In the present invention, weight average molecular weight may be measured at 40° C. using a gel permeation chromatograph (GPC) filled with porous silica as a column filling material and using tetrahydrofuran (THF) as a solvent. In this case, the weight average molecular weight of the copolymer is determined relative to that of a standard polystyrene (PS) specimen.

For example, the α-methyl styrene compound-vinyl cyanide compound copolymer may be a copolymer prepared by polymerizing 60 to 80% by weight of an α-methyl styrene compound and 20 to 40% by weight of a vinyl cyanide compound, preferably 65 to 75% by weight of an α-methyl styrene compound and 25 to 35% by weight of a vinyl cyanide compound. In this case, heat resistance may be excellent.

For example, the α-methyl styrene compound may include one or more selected from the group consisting of α-methyl styrene and derivatives thereof. In this case, heat resistance may be excellent.

For example, the derivatives of α-methyl styrene may be compounds in which one or more hydrogens of α-methyl styrene are substituted with a substituent such as an akyl group having 1 to 10 carbon atoms and a halogen group, preferably compounds in which one or more hydrogens in the aromatic ring of α-methyl styrene are substituted with a substituent such as an alkyl group having 1 to 10 carbon atoms and a halogen group.

For example, the vinyl cyanide compound copolymer may be acrylonitrile, methacrylonitrile, or a mixture thereof.

For example, as shown in Formula 1 below, the α-methyl styrene compound-vinyl cyanide compound copolymer may be a copolymer of α-methyl styrene and acrylonitrile.

[Formula 1]

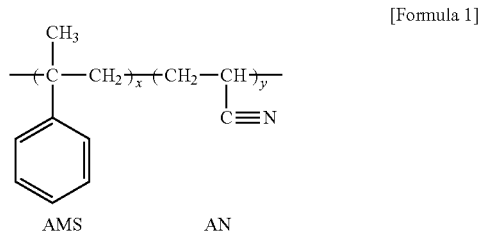

AMS    AN

For example, the α-methyl styrene compound-vinyl cyanide compound copolymer may be prepared by adding 0.01 to 0.5 parts by weight, preferably 0.01 to 0.3 parts by weight of a polymerization initiator to 100 parts by weight of a monomer mixture including 60 to 80% by weight of an α-methyl styrene compound and 20 to 40% by weight of a vinyl cyanide monomer and performing bulk polymerization.

For example, the polymerization initiator may include one or more selected from the group consisting of 1,1-bis(t-butyl peroxy)cyclohexane, t-butylperoxy-2-ethylhexanoate, benzoyl peroxide, t-butyl peroxyisobutyrate, 2,2-bis(4,4-di-t-butylperoxy cyclohexane)propane, t-hexyl peroxy isopropyl monocarbonate, t-butyl peroxylaurate, t-butylperoxy isopropyl monocarbonate, t-butylperoxy 2 ethylhexyl monocarbonate, t-hexyl peroxybenzoate, t-butyl peroxyacetate, 2,2-bis(t-butyl peroxy)butane, t-butyl peroxybenzoate, dicumyl peroxide, 2,5-dimethyl-2,5-bis(t-butyl peroxy)hexane, t-butylcumyl peroxide, di-t-butyl peroxide, and di-t-amyl peroxide. Preferably, the polymerization initiator is 1,1-bis(t-butyl peroxy)cyclohexane.

Alkoxylated Polyethyleneimine

Based on 100 parts by weight of a base resin, the alkoxylated polyethyleneimine may be included in an amount of 0.4 to 3 parts by weight, preferably 0.5 to 2.7 parts by weight, more preferably 0.5 to 2.5 parts by weight, most preferably 0.5 to 2 parts by weight. In this case, chemical resistance and paintability may be excellent without degradation in fluidity, heat resistance, and mechanical strength.

For example, the alkoxylated polyethyleneimine may include a polymer moiety having repeat units including an amine group and an ethylene group. For example, the polymer moiety may serve as the polyethyleneimine backbone of the alkoxylated polyethyleneimine. For example, the alkoxylated polyethyleneimine may be formed by modifying one or more nitrogen atoms of an amine group into one or more alkoxy moieties.

For example, the amine group of the polyethyleneimine backbone may include one or more selected from the group consisting of a primary amine group shown in Formulas 3 and 4 below, a secondary amine group shown in Formulas 2 and 3 below, and a tertiary amine group shown in Formulas 3 and 4 below, without being limited thereto.

The polyethyleneimine backbone may have a linear, branched, dendrimer-type, or comb-like structure.

[Formula 2]

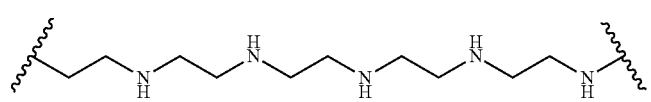

[Formula 3]

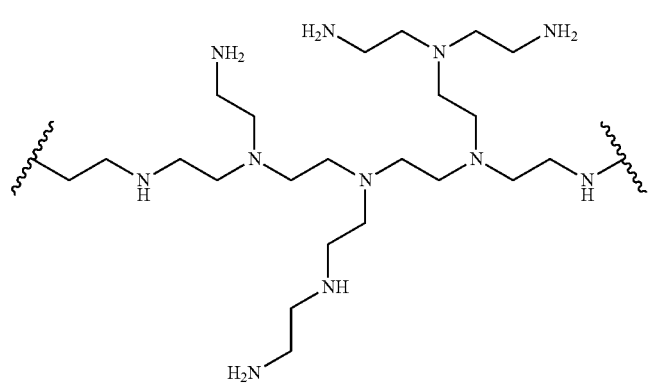

[Formula 4]

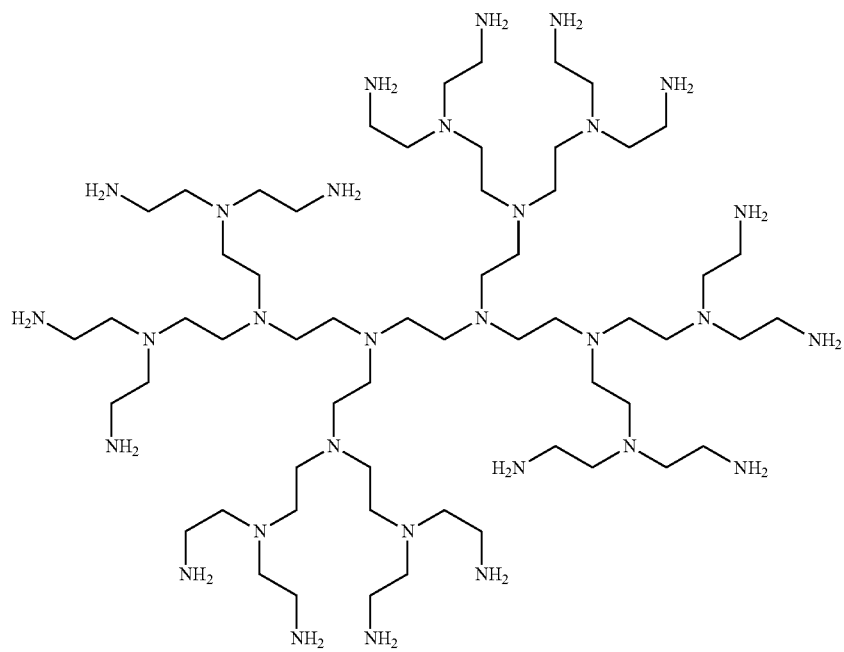

For example, in the polyethyleneimine backbone structure, one or more hydrogen atoms of an amine group may be substituted with one or more alkoxy moieties.

For example, the alkoxy moiety of the alkoxylated polyethyleneimine may be an ethoxy moiety, a propoxy moiety, Or a butoxy moiety. For example, the alkoxylated polyethyleneimine may include one or more selected from the group consisting of an ethoxy moiety, a propoxy moiety, and a butoxy moiety.

In the present invention, a moiety means a part of a molecule.

For example, the alkoxylated polyethyleneimine may include one or more selected from the group consisting of ethoxylated polyethyleneimines, propoxylated polyethyleneimines, ethoxylated-butoxylated polyethyleneimines, and ethoxylated-propoxylated-butoxylated polyethyleneimines. In this case, chemical resistance and paintability may be excellent without degradation in fluidity, heat resistance, and mechanical strength.

For example, the alkoxylated polyethyleneimine may have an alkoxylation weight percentage of 60% by weight or more, preferably 60 to 90% by weight, more preferably 60 to 80% by weight. Within this range, chemical resistance and paintability may be excellent without degradation in fluidity, heat resistance, and mechanical strength.

In the present invention, the alkoxylation weight percentage may be measured by nuclear magnetic resonance (NMR) spectrum analysis.

When dynamic viscosity is measured at 40° C. using a Brookfield viscometer, the alkoxylated polyethyleneimine may have a dynamic viscosity of 700 to 1,500 mPa·s, preferably 800 to 1,400 mPa·s, more preferably 1,000 to 1,200 mPa·s. Within this range, fluidity and physical property balance may be excellent.

Preferably, the alkoxylated polyethyleneimine is an ethoxylated polyethyleneimine having a plurality of nitrogen atoms. For example, the number of ethoxy moieties bonded to each nitrogen of the polyethyleneimine backbone may be 1 to 40, 5 to 35, 10 to 30, or 15 to 25, preferably 17 to 23, more preferably 18 to 22.

For example, the branched ethoxylated polyethyleneimine may be a compound represented by Formula 5 below. In this case, chemical resistance and paintability may be excellent without degradation in fluidity.

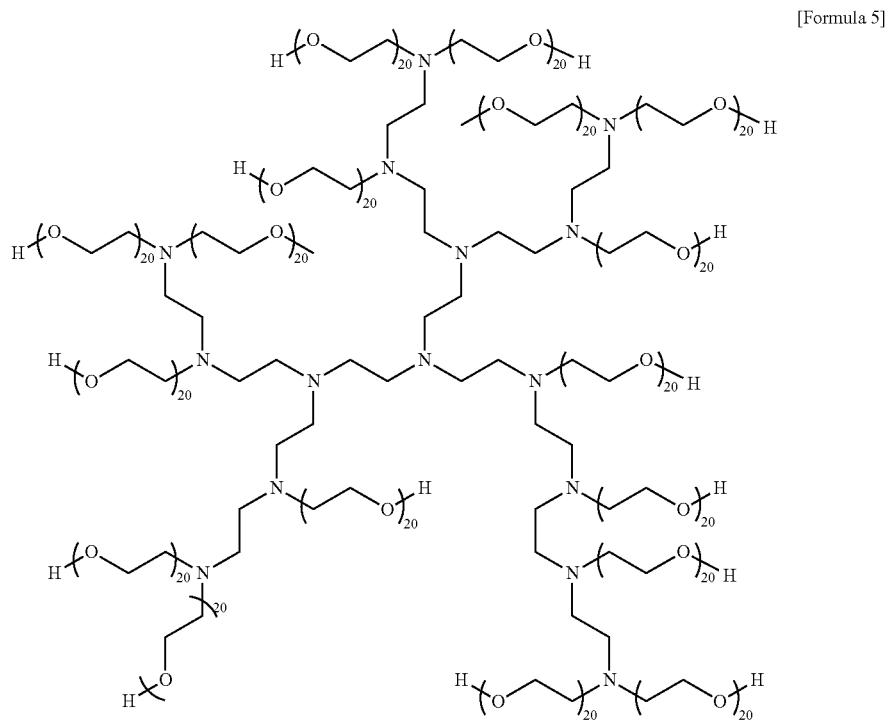

30

For example, the alkoxylated polyethyleneimine may be formed through acid-catalyzed ring opening reaction of ethyleneimine or aziridine.

FIG. 1 schematically illustrates an alkoxylated polyethyleneimine in which hydrophilic groups (EO) and hydrophobic groups (AO) are connected via amino groups. The resin surface may be modified by the hydrophilic and hydrophobic groups of the alkoxylated polyethyleneimine, thereby improving chemical resistance.

When chemical resistance is measured according to a method described below, the thermoplastic resin composition may have a chemical resistance of 300 seconds or more, preferably 300 to 800 seconds, more preferably 350 to 700 seconds. Within this range, paintability may be improved while maintaining fluidity, thereby preventing generation of pinholes.

In the present invention, chemical resistance is measured by fixing a specimen having a size of 200×12.7×3.2 mm to a curved jig having a strain of 1.7%, applying 200 μl of thinner to the specimen, and measuring time at which cracks are generated in the specimen.

For example, the thinner may be a mixture of 45% by weight of naphtha, 25% by weight of xylene, 20% by weight of propylene glycol monomethyl ether, and 10% by weight of n-butyl acetate.

For example, when paintability is measured using a paintability evaluation method described below, in the case of the thermoplastic resin composition of the present invention, no pinhole is generated in a paintability test. In this case, since chemical resistance to chemical solvents is improved, the thermoplastic resin composition may be applied to painting products.

In the present invention, according to the paintability evaluation method, a specimen having a size of 10 cm×10 cm is degreased using isopropyl alcohol, and 50 ml of a black painting material is sprayed onto the specimen. After 5 minutes, 50 ml of a clear painting material is sprayed onto the specimen, and the specimen is dried in an oven set to 85° C. for 30 minutes. Then, the number of pinholes generated in a painted surface is counted.

For example, the black painting material may be a painting material including methyl methacrylate, a butylacrylate-2-hydroxyethyl methacrylate copolymer, a thermosetting acrylic resin, carbon black, a solvent, and the like.

For example, the clear painting material may be a painting material including butyl 2-methylprop-2-enoate, 2 hydroxyethyl 2-methylprop-2-enoate, methyl 2-methylprop-2-enoate, styrene, a thermosetting acrylic resin, an organic solvent, and the like.

For example, when impact strength is measured on a specimen having a thickness of ¼" according to ASTM D256, the thermoplastic resin composition may have an impact strength of 20 kgf·cm/cm or more, preferably 20.5 to 30 kgf·cm/cm, more preferably 21.5 to 26.8 kgf·cm/cm. Within this range, fluidity, heat resistance and physical property balance may be excellent.

For example, in the thermoplastic resin composition, based on 100 parts by weight of a base resin, one or more selected from the group consisting of lubricants, flame retardants, heat stabilizers, antioxidants, light stabilizers, compatibilizers, pigments, dyes, and inorganic additives may be included in an amount of 1 to 5 parts by weight, preferably 1.5 to 4 parts by weight, more preferably 2 to 3 parts by weight. In this case, chemical resistance, paintability, and physical property balance may be excellent.

For example, the lubricants may include one or more selected from the group consisting of wax, silicone oil, and stearamide.

For example, the silicone oil may include one or more selected from the group consisting of dimethyl silicone oil, methyl hydrogen silicone oil, ester modified silicone oil, hydroxy silicone oil, carbinol modified silicone oil, vinyl silicone oil, and silicone acrylate.

For example, the heat stabilizers may include one or more selected from the group consisting of tris(nonylphenyl) phosphite, tris(2,4-di-t-butylphenyl) phosphite (TBPP), 2,4,6-tri-t-butylphenyl-2-butyl-2-ethyl-1,3-propanediol phosphite, diisodecyl pentaerythritol diphosphite, distearyl pentaerythritol diphosphite, bis(2,4-di-t-butylphenyl) pentaerythritol diphosphite (PEP24), bis(2,4-di-cumylphenyl) pentaerythritol diphosphite, and tetrakis(2,4-di-t-butylphenyl)[1,1-biphenyl]-4,4'-diyl bisphosphonate.

For example, the antioxidants may include hindered phenolic antioxidants, phosphide antioxidants, or mixtures thereof.

A method of preparing a thermoplastic resin composition according to the present invention may include a step of melt-kneading and extruding 100 parts by weight of a base resin including 20 to 40% by weight of a vinyl cyanide compound-conjugated diene compound-aromatic vinyl compound graft copolymer and 60 to 80% by weight of an α-methyl styrene compound-vinyl cyanide compound copolymer and 0.4 to 3 parts by weight of an alkoxylated polyethyleneimine at 230 to 270° C. and 200 to 400 rpm. In this case, chemical resistance and paintability may be excellent without degradation in fluidity, heat resistance, and mechanical strength.

For example, the step of melt-kneading and extruding may be performed at 230 to 245° C. and 200 to 370 rpm, preferably at 230 to 240° C. and 250 to 350 rpm. In this case, chemical resistance and mechanical properties may be excellent.

For example, when melt-kneading is performed, based on 100 parts by weight of a base resin, one or more selected from the group consisting of lubricants, flame retardants, heat stabilizers, anti-dripping agents, antioxidants, light stabilizers, compatibilizers, pigments, dyes, and inorganic additives may be included in an amount of 0.1 to 5 parts by weight, preferably 0.3 to 4 parts by weight, more preferably 0.5 to 3 parts by weight. In this case, chemical resistance may be imparted, and physical property balance may be excellent.

For example, an extrusion product obtained through the melt-kneading and extrusion step may be a thermoplastic resin composition in a pellet form.

For example, a step of injection-molding the extrusion product in a pellet form may be included to manufacture an injection-molded article. For example, injection molding may be performed at 210 to 250° C., preferably 215 to 240° C., more preferably 220 to 230° C., and at an injection speed of 7 to 13 mm/sec, more preferably 75 to 85 mm/sec. Within this range, chemical resistance and paintability may be excellent without degradation in fluidity.

Since the vinyl cyanide compound-conjugated diene compound-aromatic vinyl compound graft copolymer, α-methyl styrene compound-vinyl cyanide compound copolymer, and alkoxylated polyethyleneimine included in the thermoplastic resin composition have been described above, description thereof is omitted.

The molded article of the present invention includes the thermoplastic resin composition. In this case, chemical resistance and paintability may be excellent without degradation in fluidity, heat resistance, and mechanical strength.

For example, the molded article may be an injection-molded article for automobiles, such as a radiator grill, a spoiler, a trunk garnish, and a switch panel.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications may be made without departing from the spirit and scope of the present invention, and such changes and modifications are also within the scope of the appended claims.

EXAMPLES

Components used in Examples and Comparative Examples below are as follows.

ABS resin (a vinyl cyanide compound-conjugated diene compound-aromatic vinyl compound graft copolymer): DP270 (a graft polymer containing 60% by weight of conjugated diene rubber, 30% by weight of styrene, and 10% by weight of acrylonitrile) (LG Chemical Co.)

AMS heat-resistant resin (an α-methyl styrene compound-vinyl cyanide compound copolymer): 100UH (a copolymer containing 69% by weight of α-methyl styrene and 31% by weight of acrylonitrile) (LG Chemical Co.)

Alkoxylated polyethyleneimine (APEI): PN80 (alkoxylation rate: 60% by weight or more; and dynamic viscosity measured at 50° C. using a Brookfield viscometer: 1,000 to 1,200 mPa·s) (BASF Co.)

Polyethyleneimine (PEI): Lupasol G20 (unalkoxylated polyethyleneimine; weight average molecular weight: 1,300 g/mol; and dynamic viscosity measured at 50° C. using a Brookfield viscometer: 400 mPa·s) (BASF Co.)

Example 1

0.5 parts by weight of alkoxylated polyethyleneimine was added to 100 parts by weight of a base resin including 27% by weight of the ABS resin and 73% by weight of the AMS heat-resistant resin, and melt-kneading and extrusion were performed at 250° C. and 300 rpm using a twin screw extruder to obtain an extrusion product in a pellet form. Then, the extrusion product was dried at 80° C. for 4 hours and injection-molded under the conditions of injection temperature of 240° C., molding temperature of 60° C., and injection speed of 10 mm/sec using an injection machine to prepare a specimen for measuring various physical properties.

Examples 2 to 5 and Comparative Examples 1 to 8

Specimens were prepared in the same manner as in Example 1, except that alkoxylated polyethyleneimine or polyethyleneimine was mixed with a base resin including the ABS resin and the AMS heat-resistant resin according to the composition ratios shown in Tables 1 and 2.

Test Example

The properties of specimens prepared in Examples 1 to 5 and Comparative Example 1 to 8 were measured according to the following methods, and the results are shown in Tables 1 and 2.

Measurement Methods

Izod impact strength (kgf·cm/cm): measured using a specimen having a thickness of ¼" according to ASTM D256.

Fluidity (g/10 min): measured under the conditions of 220° C. and 10 kg according to ASTM D256.

Heat deflection temperature (HDT, ° C.): measured using a specimen having a thickness of ¼" at a load of 18.6 kgf/cm² according to ASTM D648.

Chemical resistance: a specimen having a size of 200× 12.7×3.2 mm was fixed to a curved jig having a strain of 1.7%, 200 μl of thinner (T803, NOROO BEE Chemical Co., Ltd.) was applied to the specimen, and time at which cracks were generated in the specimen was measured.

Paintability: a specimen having a size of 10 cm×10 cm was degreased using isopropyl alcohol, 50 ml of a black painting material (UT578(A)-EB(PC), KCC Co.) was sprayed onto the specimen, and after 5 minutes, 50 ml of a clear painting material (UT5015-A-CLEAR, KCC Co.) was sprayed onto the specimen. Then, the specimen was dried in an oven set to 85° C. for 30 minutes, and the number of pinholes generated in a painted surface was counted according to the following criteria.

○: no pinhole is generated
Δ: 1 to 5 pinholes are generated at the corners
X: 6 or more pinholes are generated at the corners

TABLE 1

| Classification | Example 1 | Example 2 | Example 3 | Example 4 | Example 5 |
|---|---|---|---|---|---|
| ABS resin (parts by weight) | 27 | 27 | 27 | 30 | 30 |
| AMS heat-resistant resin (parts by weight) | 73 | 73 | 73 | 70 | 70 |
| APEI (parts by weight) | 0.5 | 1 | 2 | 0.5 | 1 |
| PEI (parts by weight) | — | — | — | — | — |
| Izod impact strength (kgf · cm/cm) | 22.0 | 21.5 | 20.5 | 26.8 | 26.0 |
| Fluidity (g/10 min) | 7 | 7.1 | 7.5 | 5.2 | 5.6 |
| HDT (° C.) | 101.6 | 101.3 | 100.8 | 98.5 | 98.0 |
| Chemical resistance (sec.) | 350 | 500 | 700 | 550 | 700 |
| paintability | ○ | ○ | ○ | ○ | ○ |

TABLE 2

| Classification | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| ABS resin (parts by weight) | 27 | 27 | 27 | 27 | 27 | 30 | 50 | 10 |
| AMS heat-resistant resin (parts by weight) | 73 | 73 | 73 | 73 | 73 | 70 | 50 | 90 |
| APEI (parts by weight) | — | — | 0.2 | 5 | 10 | — | 1 | 1 |
| PEI (parts by weight) | 1 | 4 | — | — | — | — | — | — |
| Izod impact strength (kgf · cm/cm) | 21.0 | 18.0 | 22.1 | 15.0 | 11.5 | 27.0 | 30 | 6 |
| Fluidity (g/10 min) | 7.5 | 8.0 | 7.4 | 8.5 | 11.0 | 6.0 | 3.0 | 15 |
| HDT (° C.) | 98.3 | 95.7 | 100.0 | 98.0 | 101.7 | 98.0 | 85 | 106 |
| Chemical resistance (sec.) | 40 | 60 | 100 | 800 | 800 | 300 | 900 | 150 |
| paintability | x | x | Δ | ○ | ○ | x | x | x |

As shown in Tables 1 and 2, compared to Comparative Examples 1 to 8, the specimens of Examples 1 to 5 according to the present invention exhibited excellent chemical resistance and paintability without degradation in impact strength, fluidity, and heat deflection temperature. In the cases of Comparative Example 6 not including alkoxylated polyethyleneimine and Comparative Examples 1 and 2 including unalkoxylated polyethyleneimine, chemical resistance and paintability were poor.

In addition, in the case of Comparative Example 3 including a small amount of alkoxylated polyethyleneimine, chemical resistance and paintability were degraded. In the cases of Comparative Examples 4 and 5 including an excess of alkoxylated polyethyleneimine, impact strength was significantly reduced.

In addition, in the case of Comparative Example 7 in which an excess of the ABS resin was included in the base resin, fluidity, heat deflection temperature, and paintability were degraded. In the case of Comparative Example 8 including a small amount of the ABS resin, impact strength, chemical resistance, and paintability were degraded.

The invention claimed is:

1. A thermoplastic resin composition, comprising:
   100 parts by weight of a base resin comprising 20 to 40% by weight of a vinyl cyanide compound-conjugated diene compound-aromatic vinyl compound graft copolymer and 60 to 80% by weight of an α-methyl styrene compound-vinyl cyanide compound copolymer; and
   0.4 to 3 parts by weight of an alkoxylated polyethyleneimine,
   wherein the alkoxylated polyethyleneimine has an alkoxylation percentage of 60% by weight or more.

2. The thermoplastic resin composition according to claim 1, wherein the alkoxylated polyethyleneimine comprises one or more selected from the group consisting of ethoxylated polyethyleneimines, propoxylated polyethyleneimines, ethoxylated-butoxylated polyethyleneimines, and ethoxylated-propoxylated-butoxylated polyethyleneimines.

3. The thermoplastic resin composition according to claim 1, wherein, when dynamic viscosity is measured at 40° C. using a Brookfield viscometer, the alkoxylated polyethyleneimine has a dynamic viscosity of 700 to 1,500 mPa·s.

4. The thermoplastic resin composition according to claim 1, wherein the vinyl cyanide compound-conjugated diene compound-aromatic vinyl compound graft copolymer is a graft copolymer prepared by graft-polymerizing 40 to 80% by weight of conjugated diene rubber, 10 to 40% by weight of an aromatic vinyl compound, and 1 to 20% by weight of a vinyl cyanide compound.

5. The thermoplastic resin composition according to claim 1, wherein the α-methyl styrene compound-vinyl cyanide compound copolymer is a copolymer prepared by polymerizing 50 to 80% by weight of an α-methyl styrene compound and 20 to 50% by weight of a vinyl cyanide compound.

6. The thermoplastic resin composition according to claim 1, wherein an α-methyl styrene compound of the α-methyl styrene compound-vinyl cyanide compound copolymer comprises one or more selected from the group consisting of α-methyl styrene and derivatives thereof.

7. The thermoplastic resin composition according to claim 1, wherein, when chemical resistance is evaluated by fixing a specimen having a size of 200×12.7×3.2 mm to a curved jig having a strain of 1.7%, applying 200 μl of thinner prepared by mixing 45% by weight of naphtha, 25% by weight of xylene, 20% by weight of propylene glycol monomethyl ether, and 10% by weight of n-butyl acetate to the specimen, and measuring time at which cracks are generated in the specimen, the thermoplastic resin composition has a chemical resistance of 300 seconds or more.

8. The thermoplastic resin composition according to claim 1, wherein, when paintability is evaluated by degreasing a specimen having a size of 10 cm×10 cm using isopropyl alcohol, spraying 50 ml of a black painting material comprising methyl methacrylate, a butylacrylate-2-hydroxyethyl methacrylate copolymer, a thermosetting acrylic resin, carbon black, and a solvent onto the specimen, after 5 minutes, spraying 50 ml of a clear painting material comprising butyl 2-methylprop-2-enoate, 2-hydroxyethyl 2-methylprop-2-enoate, methyl 2-methylprop-2-enoate, styrene, a thermosetting acrylic resin, and an organic solvent onto the specimen, drying the specimen in an oven set to 85° C. for 30 minutes, and counting the number of pinholes generated in a painted surface, no pinhole is generated in the thermoplastic resin composition.

9. The thermoplastic resin composition according to claim 1, wherein, when impact strength is measured on a specimen having a thickness of ¼" according to ASTM D256, the thermoplastic resin composition has an impact strength of 20 kgf·cm/cm or more.

10. A method of preparing a thermoplastic resin composition, the method comprising:
melt-kneading and extruding 100 parts by weight of a base resin comprising 20 to 40% by weight of a vinyl cyanide compound-conjugated diene compound-aromatic vinyl compound graft copolymer and 60 to 80% by weight of an α-methyl styrene compound-vinyl cyanide compound copolymer and 0.4 to 3 parts by weight of an alkoxylated polyethyleneimine at 230 to 270° C. and 200 to 400 rpm,
wherein the alkoxylated polyethyleneimine has an alkoxylation percentage of 60% by weight or more.

11. A molded article manufactured using the thermoplastic resin composition according to claim 1.

* * * * *